(12) United States Patent
Ogasahara

(10) Patent No.: US 8,682,174 B2
(45) Date of Patent: Mar. 25, 2014

(54) OPTICAL RECEIVER, OPTICAL COMMUNICATION SYSTEM USING THE SAME AND EQUALIZATION METHOD IN THE OPTICAL COMMUNICATION SYSTEM

(75) Inventor: Daisaku Ogasahara, Tokyo (JP)

(73) Assignee: NEC Corporation, Tokyo (JP)

( * ) Notice: Subject to any disclaimer, the term of this patent is extended or adjusted under 35 U.S.C. 154(b) by 143 days.

(21) Appl. No.: 13/026,624

(22) Filed: Feb. 14, 2011

(65) Prior Publication Data

US 2012/0039607 A1 Feb. 16, 2012

(30) Foreign Application Priority Data

Feb. 18, 2010 (JP) .................. 2010-033560

(51) Int. Cl.
  *H04B 10/12* (2011.01)
  *H04B 10/00* (2013.01)
  *H04B 10/06* (2011.01)

(52) U.S. Cl.
  USPC ........... 398/149; 398/140; 398/152; 398/159; 398/205; 398/208

(58) Field of Classification Search
  USPC ......... 398/140–149, 152, 158, 159, 182–184, 398/192, 200, 202–205, 208, 209
  See application file for complete search history.

(56) References Cited

U.S. PATENT DOCUMENTS

| 7,460,793 B2* | 12/2008 | Taylor ......................... 398/208 |
| 7,636,525 B1* | 12/2009 | Bontu et al. ................ 398/208 |
| 2003/0112424 A1* | 6/2003 | Gordon et al. .............. 356/73.1 |
| 2008/0152362 A1* | 6/2008 | Koc ............................. 398/205 |

FOREIGN PATENT DOCUMENTS

JP 2007528175 A 10/2007

OTHER PUBLICATIONS

Spinnler et al, "Adaptive Equalizer Complexity in Coherent Optical Receivers," Sep. 21-25, 2008, published at the 34th European Conference on Optical Communication, pp. 1 and 2.*
Spinnler et al, "Adaptive Equalizer Complexity in Coherent Optical Receivers" (published at 34th European Conference on Optical Communication, Sep. 12-15, 2008).*

* cited by examiner

*Primary Examiner* — Leslie Pascal
*Assistant Examiner* — Casey Kretzer
(74) *Attorney, Agent, or Firm* — Sughrue Mion, PLLC

(57) ABSTRACT

An optical receiver according to the invention includes a polarization diversity unit receiving a polarization multiplexed optical signal obtained by multiplexing two optical signals having a same frequency band of carrier waves and polarization states orthogonal to each other, and a frequency domain equalization unit receiving signal components parallel to mutually orthogonal polarization axes from the polarization diversity unit, wherein the frequency domain equalization unit includes filters for which filter coefficients thereof are set for compensating degradation of transmission characteristics in one optical signal without polarization multiplexing by means of the frequency domain equalization.

10 Claims, 9 Drawing Sheets

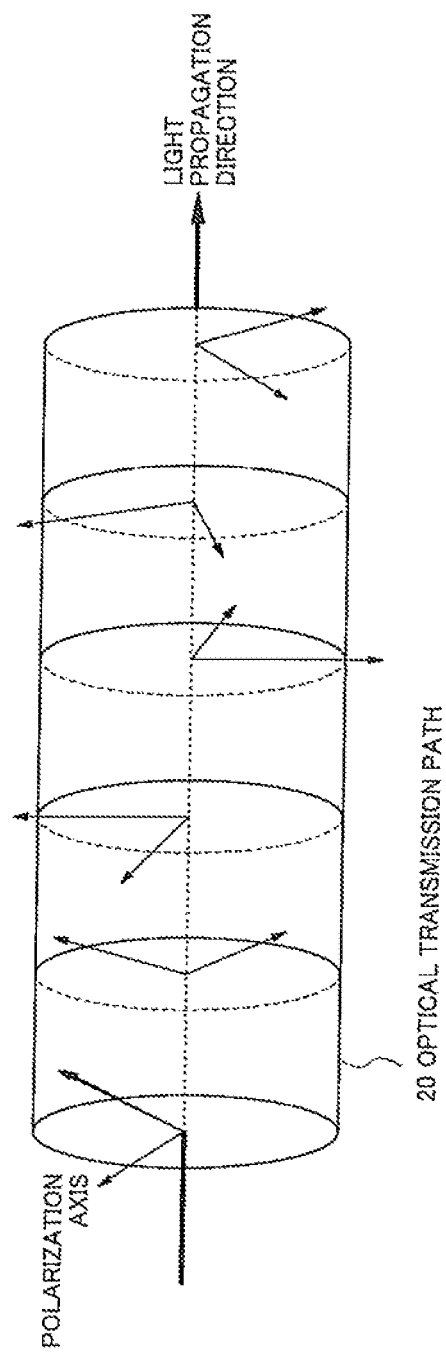

Fig.3

EQUATION (e1)

$$\gamma_{11}^{(i)} = \frac{\lambda_{22}^{(i)}\left(\lambda_{11}^{(i)*}\lambda_{22}^{(i)*} - \lambda_{12}^{(i)*}\lambda_{21}^{(i)*}\right) + \frac{\sigma_n^2}{\sigma_s^2}\lambda_{11}^{(i)*}}{|\lambda_{11}^{(i)}|^2|\lambda_{22}^{(i)}|^2 + |\lambda_{12}^{(i)}|^2|\lambda_{21}^{(i)}|^2 + \frac{\sigma_n^2}{\sigma_s^2}\left(|\lambda_{11}^{(i)}|^2 + |\lambda_{22}^{(i)}|^2\right) + \left(\frac{\sigma_n^2}{\sigma_s^2}\right)^2 - \lambda_{11}^{(i)}\lambda_{21}^{(i)*}\lambda_{22}^{(i)}\lambda_{12}^{(i)*} - \lambda_{12}^{(i)}\lambda_{22}^{(i)*}\lambda_{21}^{(i)}\lambda_{11}^{(i)*}}$$

EQUATION (e2)

$$\gamma_{12}^{(i)} = \frac{\lambda_{21}^{(i)}\left(-\lambda_{11}^{(i)*}\lambda_{22}^{(i)*} + \lambda_{12}^{(i)*}\lambda_{21}^{(i)*}\right) + \frac{\sigma_n^2}{\sigma_s^2}\lambda_{12}^{(i)*}}{|\lambda_{11}^{(i)}|^2|\lambda_{22}^{(i)}|^2 + |\lambda_{12}^{(i)}|^2|\lambda_{21}^{(i)}|^2 + \frac{\sigma_n^2}{\sigma_s^2}\left(|\lambda_{11}^{(i)}|^2 + |\lambda_{22}^{(i)}|^2\right) + \left(\frac{\sigma_n^2}{\sigma_s^2}\right)^2 - \lambda_{11}^{(i)}\lambda_{21}^{(i)*}\lambda_{22}^{(i)}\lambda_{12}^{(i)*} - \lambda_{12}^{(i)}\lambda_{22}^{(i)*}\lambda_{21}^{(i)}\lambda_{11}^{(i)*}}$$

EQUATION (e3)

$$\gamma_{21}^{(i)} = \frac{\lambda_{12}^{(i)}\left(-\lambda_{11}^{(i)*}\lambda_{22}^{(i)*} + \lambda_{12}^{(i)*}\lambda_{21}^{(i)*}\right) + \frac{\sigma_n^2}{\sigma_s^2}\lambda_{21}^{(i)*}}{|\lambda_{11}^{(i)}|^2|\lambda_{22}^{(i)}|^2 + |\lambda_{12}^{(i)}|^2|\lambda_{21}^{(i)}|^2 + \frac{\sigma_n^2}{\sigma_s^2}\left(|\lambda_{11}^{(i)}|^2 + |\lambda_{22}^{(i)}|^2\right) + \left(\frac{\sigma_n^2}{\sigma_s^2}\right)^2 - \lambda_{11}^{(i)}\lambda_{21}^{(i)*}\lambda_{22}^{(i)}\lambda_{12}^{(i)*} - \lambda_{12}^{(i)}\lambda_{22}^{(i)*}\lambda_{21}^{(i)}\lambda_{11}^{(i)*}}$$

EQUATION (e4)

$$\gamma_{22}^{(i)} = \frac{\lambda_{11}^{(i)}\left(\lambda_{11}^{(i)*}\lambda_{22}^{(i)*} - \lambda_{12}^{(i)*}\lambda_{21}^{(i)*}\right) + \frac{\sigma_n^2}{\sigma_s^2}\lambda_{22}^{(i)*}}{|\lambda_{11}^{(i)}|^2|\lambda_{22}^{(i)}|^2 + |\lambda_{12}^{(i)}|^2|\lambda_{21}^{(i)}|^2 + \frac{\sigma_n^2}{\sigma_s^2}\left(|\lambda_{11}^{(i)}|^2 + |\lambda_{22}^{(i)}|^2\right) + \left(\frac{\sigma_n^2}{\sigma_s^2}\right)^2 - \lambda_{11}^{(i)}\lambda_{21}^{(i)*}\lambda_{22}^{(i)}\lambda_{12}^{(i)*} - \lambda_{12}^{(i)}\lambda_{22}^{(i)*}\lambda_{21}^{(i)}\lambda_{11}^{(i)*}}$$

Fig.4

EQUATION (f1)

$$\gamma_{11}^{(i)} = \frac{\lambda_{11}^{(i)*}}{\left|\lambda_{11}^{(i)}\right|^2 + \left|\lambda_{21}^{(i)}\right|^2 + \frac{\sigma_n^2}{\sigma_s^2}}$$

EQUATION (f2)

$$\gamma_{12}^{(i)} = \frac{\lambda_{12}^{(i)*}}{\left|\lambda_{22}^{(i)}\right|^2 + \left|\lambda_{12}^{(i)}\right|^2 + \frac{\sigma_n^2}{\sigma_s^2}}$$

EQUATION (f3)

$$\gamma_{21}^{(i)} = \frac{\lambda_{21}^{(i)*}}{\left|\lambda_{11}^{(i)}\right|^2 + \left|\lambda_{21}^{(i)}\right|^2 + \frac{\sigma_n^2}{\sigma_s^2}}$$

EQUATION (f4)

$$\gamma_{22}^{(i)} = \frac{\lambda_{22}^{(i)*}}{\left|\lambda_{22}^{(i)}\right|^2 + \left|\lambda_{12}^{(i)}\right|^2 + \frac{\sigma_n^2}{\sigma_s^2}}$$

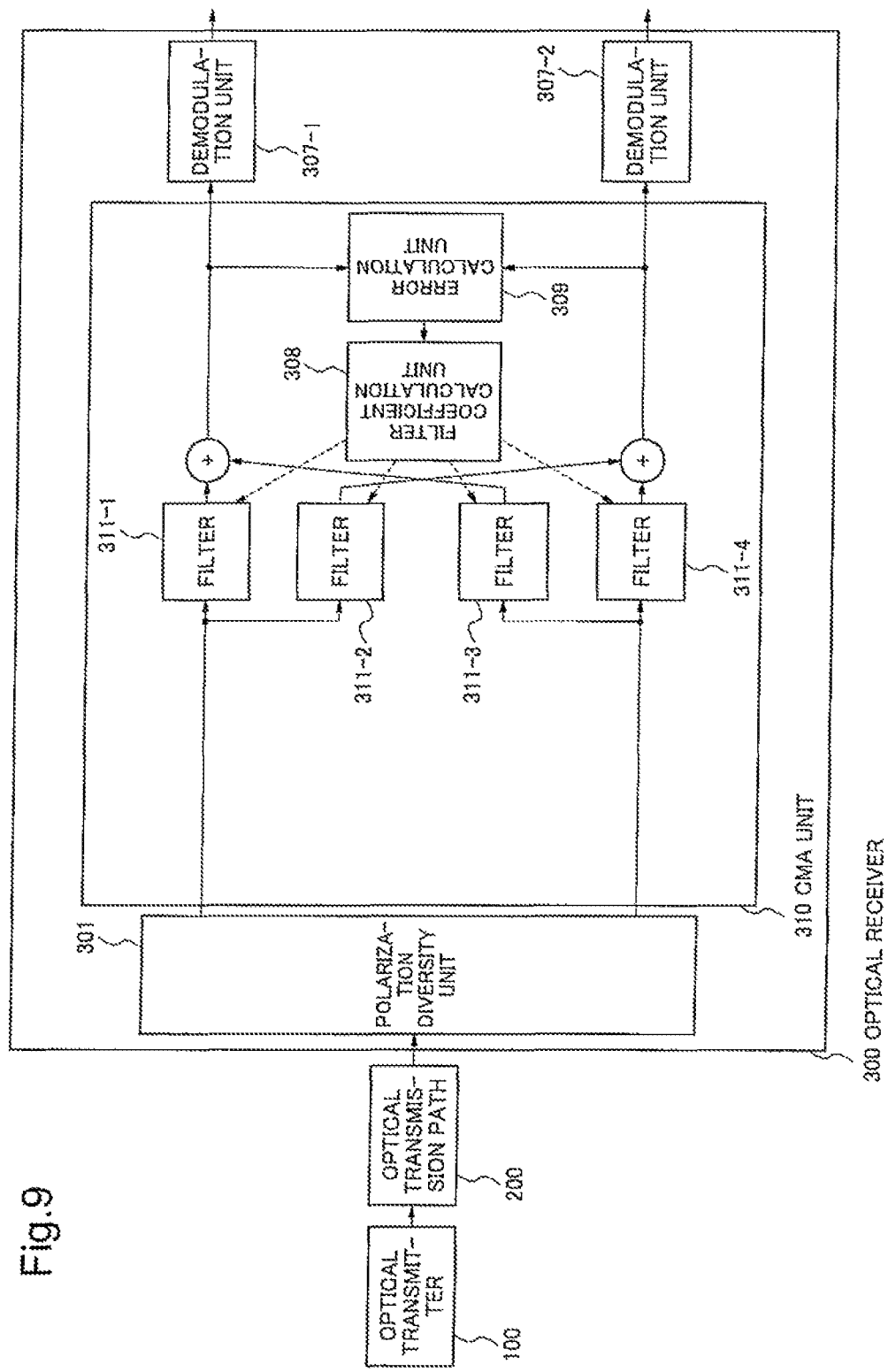

OPTICAL RECEIVER, OPTICAL COMMUNICATION SYSTEM USING THE SAME AND EQUALIZATION METHOD IN THE OPTICAL COMMUNICATION SYSTEM

This application is based upon and claims the benefit of priority from Japanese Patent Application No. 2010-033560, filed on Feb. 18, 2010, the disclosure of which is incorporated herein in its entirety by reference.

TECHNICAL FIELD

The present invention relates to an optical receiver, an optical communication system using the same and an equalization method in the optical communication system, and more particularly, to an optical receiver receiving a polarization multiplexing optical signal in which two optical signals are multiplexed such that its polarization states are orthogonal to each other, the optical communication system using the same and the equalization method in the optical communication system.

BACKGROUND ART

In recent years, owing to the spread of the Internet, the traffic volume of a backbone communication system is increased rapidly, and thus an early practical use of an ultra-high speed optical communication system beyond 40 Gbps is highly expected.

As to a technology realizing the ultra-high speed optical communication system, a polarization multiplexing-demultiplexing technology has attracted considerable interest. In the polarization multiplexing-demultiplexing technology, an optical transmitter multiplexes two optical signals having the same frequency band of carrier waves and polarization states orthogonal to each other. Hereinafter, such an optical signal obtained by multiplexing two optical signals having the same frequency band of carrier waves and polarization states orthogonal to each other is called a polarization multiplexed optical signal. And an optical receiver receives the transmitted polarization multiplexed optical signal from the optical transmitter and then demultiplexes the received polarization multiplexed optical signal into two optical signals. And thus a double transmission speed is realized.

An example of such technology related to a polarization multiplexing transmission system in which two optical signals having polarization states orthogonal to each other propagate through the same fiber is disclosed in Japanese Unexamined Patent Application Publication (Translation of PCT Application) No. 2007-528175. In this related art, an optical receiver separates two components with orthogonal polarizations included in the received signal by filtering. At that time, the related optical receiver is operable to filter them in accordance with an appropriate transfer matrix which is dynamically controlled on the basis of the output signals in such a manner as to approximate the reverse transfer matrix of the fiber in the region of the spectrum occupied by the optical signals at the same wavelength with orthogonal polarizations. As a result, the related receiver compensates for polarization mode dispersion and polarization rotation introduced by the fiber, eliminates distortion and mutual interference effects for both of the signals, and outputs demultiplexed optical signals corresponding to the two transmitted signals.

SUMMARY

An exemplary object of the invention is to provide an optical receiver, an optical communication system using the same, and an equalization method in the optical communication system which can demodulate correctly an original transmission data from a polarization multiplexed optical signal at low power consumption and low cost.

An optical receiver according to an exemplary aspect of the invention includes a polarization diversity unit receiving a polarization multiplexed optical signal obtained by multiplexing two optical signals having a same frequency band of carrier waves and polarization states orthogonal to each other, and a frequency domain equalization unit receiving signal components parallel to mutually orthogonal polarization axes from the polarization diversity unit, wherein the frequency domain equalization unit includes filters for which filter coefficients thereof are set for compensating degradation of transmission characteristics in one optical signal without polarization multiplexing by means of the frequency domain equalization.

An optical communication system according to an exemplary aspect of the invention includes an optical transmitter transmitting a polarization multiplexed optical signal obtained by multiplexing two optical signals having a same frequency band of carrier waves and polarization states orthogonal to each other, and an optical receiver receiving the polarization multiplexed optical signal transmitted from the optical transmitter through a transmission path and compensating degradation of transmission characteristics in received polarization multiplexed optical signal, wherein the optical receiver includes a polarization diversity unit receiving the polarization multiplexed optical signal, and a frequency domain equalization unit receiving signal components parallel to mutually orthogonal polarization axes from the polarization diversity unit, and wherein the frequency domain equalization unit includes filters for which filter coefficients thereof are set for compensating degradation of transmission characteristics in one optical signal without polarization multiplexing by means of the frequency domain equalization.

An equalization method in an optical communication system according to an exemplary aspect of the invention includes the steps of, transmitting a polarization multiplexed optical signal obtained by multiplexing two optical signals having a same frequency band of carrier waves and polarization states orthogonal to each other, receiving the polarization multiplexed optical signal through a transmission path, and compensating degradation of transmission characteristics in received the polarization multiplexed optical signal, wherein, in step of receiving, demultiplexing received polarization multiplexed optical signal into signal components parallel to mutually orthogonal polarization axes; and in step of compensating, filtering the signal components by using filter coefficients set for compensating degradation of transmission characteristics in one optical signal without polarization multiplexing by means of the frequency domain equalization.

BRIEF DESCRIPTION OF THE DRAWINGS

Exemplary features and advantages of the present invention will become apparent from the following detailed description when taken with the accompanying drawings in which:

FIG. 2 is a diagram showing a model representing an example of polarization mode dispersion;

FIG. 3 is a diagram showing examples of the equations representing filter coefficients set for the filters provided for the optical receiver in accordance with a first exemplary embodiment of the present invention;

FIG. 4 is a diagram showing simplified equations by condensing the equations representing the filter coefficients shown in FIG. 3;

FIG. 9 is a block diagram showing an example of a structure of a polarization multiplexing-demultiplexing optical communication system in which the equalization is performed by means of CMA.

EXEMPLARY EMBODIMENTS

Figure 1:
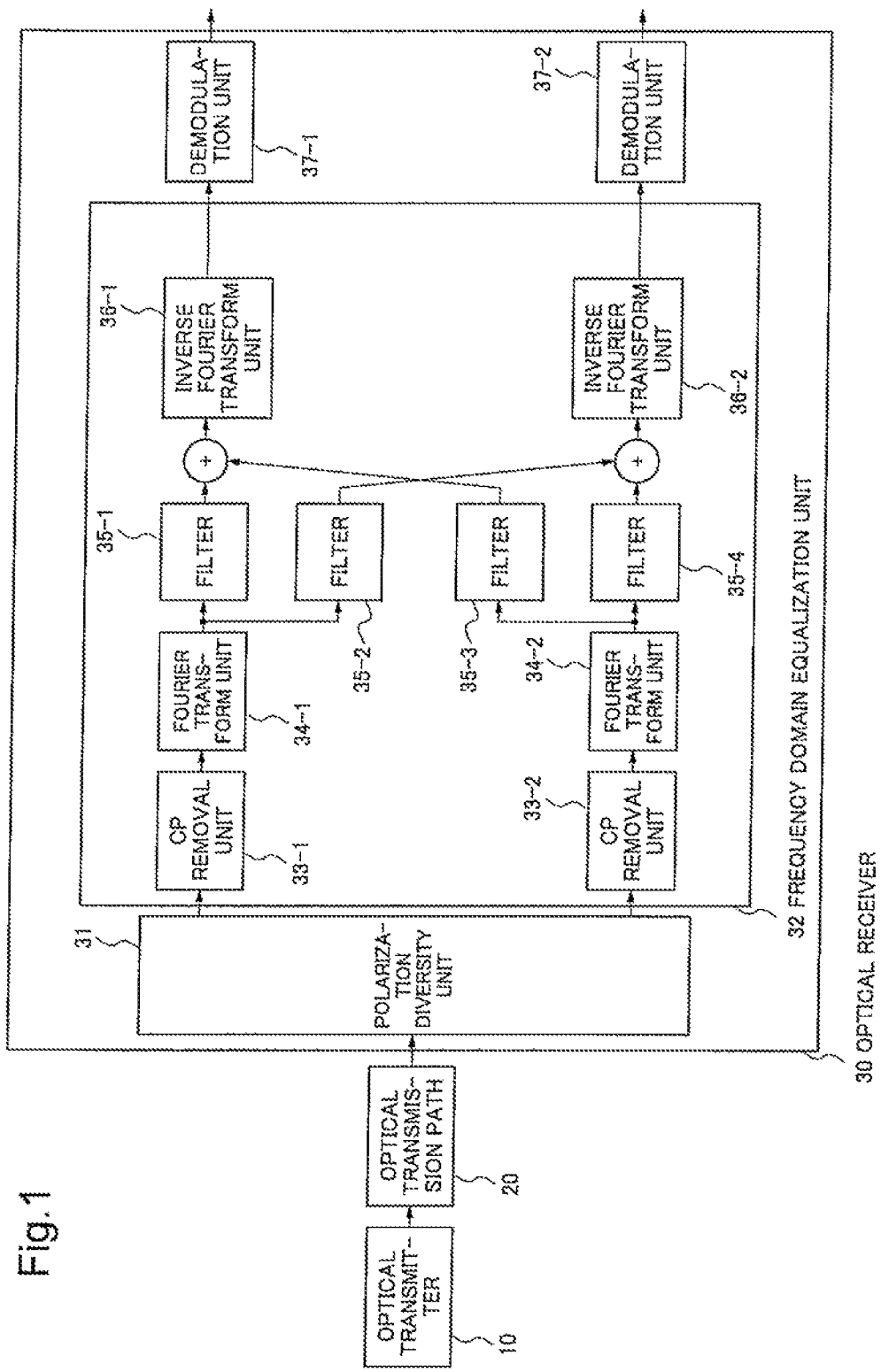
FIG. 1 is a block diagram showing a structure of a polarization multiplexing-demultiplexing optical communication system that is an optical communication system to which an optical receiver in accordance with a first exemplary embodiment of the present invention is applied.

The exemplary embodiments of the present invention will be described with reference to drawings in the followings.

Exemplary Embodiment 1

In this exemplary embodiment, a communication system called a block transmission system is used. The block transmission system is the communication system as described hereinafter.

In the block transmission system, an optical transmitter divides data into a number of blocks with predetermined length. The data which are obtained by adding a part of each block (hereinafter, referred to Cyclic Prefix) to an end of the block are made transmission data. The optical transmitter transmits an optical signal modulated by the transmission data to an optical receiver. The optical receiver receives the optical signal transmitted from the optical transmitter and removes from the received signal the Cyclic Prefix added to each transmission data in the optical transmitter. For the signal from which the Cyclic Prefix has been removed, degradation in the transmission characteristics due to waveform distortion or the like is compensated by using a frequency domain equalization (FDE) technology.

As examples of the block transmission systems, an OFDM (Orthogonal Frequency Division Multiplexing) system and an SC-CP (Single Carrier Block Transmission with Cycle Prefix) system are widely known. Further, a transmission system without using the Cyclic Prefix, which is called an overlap FDE system, is also proposed.

The frequency domain equalization is an equalization method which demodulates the transmission data by following procedures, and is an essential technology for the block transmission system. That is, in the SC-CP system, the data in which the Cyclic Prefix is removed are converted into the data on the frequency domain by means of Fourier transform. After that, the converted data are multiplied by filter coefficients which represent the inverse characteristics of the transmission path. And then, after being converted into the data on the time domain by means of inverse Fourier transform, the original transmission data are demodulated.

By adding the Cyclic Prefix, a matrix representing characteristics of the optical transmission path is expressed as a circulant matrix. Since it becomes possible to diagonalize a matrix by means of the Fourier transform matrix and the inverse Fourier transform matrix, a perfect equalization becomes possible by setting the reciprocal numbers of the eigenvalues of the diagonal matrix for the above-mentioned filter coefficients. This is the feature of the frequency domain equalization. The OFDM system is a technology similar to the SC-CP system except that the inverse Fourier transform is performed in the optical transmitter.

In the equalization process using the frequency domain equalization, an operation of the Fourier transform and the inverse Fourier transform is carried out by means of the fast Fourier transform. Therefore, the amount of its operation becomes smaller compared with the equalization processing by the time domain equalization technology using a Finite Impulse Response (FIR) filter or the like. Accordingly, by using the frequency domain equalization, circuit resources can be reduced drastically.

FIG. 1 is a block diagram showing a structure of a polarization multiplexing-demultiplexing optical communication system using the optical receiver of this exemplary embodiment. As shown in FIG. 1, the polarization multiplexing-demultiplexing optical communication system of this exemplary embodiment includes an optical transmitter 10 and an optical receiver 30. The optical transmitter 10 and the optical receiver 30 are connected to each other through an optical transmission path 20.

The optical transmitter 10 modulates two optical signals having the same frequency band of carrier waves and polarization states orthogonal to each other by two transmission data to which the Cyclic Prefix is added. Then the optical transmitter 10 transmits polarization multiplexed optical signals in which two modulated optical signals are multiplexed, to the optical receiver 30.

The optical receiver 30 is provided with a polarization diversity unit 31, a frequency domain equalization unit 32, and demodulation units 37-1 and 37-2.

The polarization diversity unit 31 receives polarization multiplexed optical signals transmitted from the optical transmitter 10 through the optical transmission path 20. By means of the polarization diversity technology, the polarization diversity unit 31 demultiplexes the received signals into signal components parallel to polarization axes orthogonal to each other (hereinafter, referred to as an x-polarization signal and a y-polarization signal). And then, it outputs the x-polarization signal and the y-polarization signal to the frequency domain equalization unit 32.

The frequency domain equalization unit 32 is provided with CP removal units 33-1 and 33-2, Fourier transform units 34-1 and 34-2, filters 35-1 to 35-4, and inverse Fourier transform units 36-1 and 36-2.

The CP removal unit 33-1 receives the x-polarization signal output from the polarization diversity unit 31 and removes the Cyclic Prefix from the x-polarization signal. Then the CP removal unit 33-1 outputs the x-polarization signal in which the Cyclic Prefix is removed to the Fourier transform unit 34-1. The CP removal unit 33-2 receives the y-polarization signal output from the polarization diversity unit 31 and removes the Cyclic Prefix from the y-polarization signal.

Then the CP removal unit 33-2 outputs the y-polarization signal in which the Cyclic Prefix is removed to the Fourier transform unit 34-2.

The Fourier transform unit 34-1 performs Fourier transformation to the x-polarization signal which is output from the CP removal unit 33-1 and the Cyclic Prefix is removed from, and outputs the transformed signal to the filters 35-1 and 35-2. The Fourier transform unit 34-2 performs the Fourier transformation to the y-polarization signal which is output from the CP removal unit 33-2 and the Cyclic Prefix is removed from, and outputs the transformed signal to the filters 35-3 and 35-4.

The filters 35-1 and 35-2 output signals which are the x-polarization signal output from the Fourier transform unit 34-1 multiplied by a filter coefficient set for each of the filters 35-1 and 35-2. The filters 35-3 and 35-4 output signals which are the y-polarization signal output from the Fourier transform unit 34-2 multiplied by a filter coefficient set for each of the filters 35-3 and 35-4. In this way, two filter coefficients are set for the x-polarization signal and the y-polarization signal, respectively, and thereby four filter coefficients are set in total.

The inverse Fourier transform unit 36-1 accepts a signal which is obtained by adding the output signal from the filter 35-1 and the output signal from the filter 35-3. The inverse Fourier transform unit 36-2 accepts a signal which is obtained by adding the output signal from the filter 35-2 and the output signal from the filter 35-4. Each of accepted signals at the inverse Fourier transform units 36-1 and 36-2 corresponds to each of two optical signals multiplexed in the optical transmitter 10. Such communication system is called a Multiple Input Multiple Output (MIMO) system.

The inverse Fourier transform unit 36-1 performs inverse Fourier transformation to the accepted signal and outputs the transformed signal to the demodulation unit 37-1. The inverse Fourier transform unit 36-2 performs inverse Fourier transformation to the accepted signal and outputs the transformed signal to the demodulation unit 37-2. The demodulation units 37-1 and 37-2 accept the output signals from the inverse Fourier transform units 36-1 and 36-2, respectively, and demodulate the accepted signals into the original transmission data.

It is necessary to satisfy the condition that the filter coefficients set for the filters 35-1 to 35-4 in the frequency domain equalization unit 32 are numerical values corresponding to the causes of degradation of the transmission characteristics to be compensated. As for the causes of the degradation of the transmission characteristics in the polarization multiplexing-demultiplexing optical communication system according to this exemplary embodiment, the following three points are considered. That is, an optical noise, a polarization mode dispersion, and another optical signal different from one to be compensated of the two polarization multiplexed optical signals, are considered as the three points. The filter coefficients for compensating degradation of the transmission characteristics of the received optical signal by means of frequency domain equalization can be calculated based on these causes of the degradation of the transmission characteristics.

FIG. 2 is a diagram showing a model representing an example of the polarization mode dispersion. As shown in FIG. 2, an optical fiber configured as an optical transmission path is divided into pieces, and each polarization axis is set at random in each piece. The model is considered that normally-distributed random propagation delay time is applied to an optical signal component parallel to the polarization axis and an optical signal component vertical to the polarization axis, respectively. Each arrow shown in FIG. 2 represents the polarization axis of each piece.

A characteristic of each piece of the optical fiber is represented by Jones matrix Ti, and characteristics $T_N$ of the whole optical fiber is expressed in a product of all of Ti. Each Ti is expressed by a product of rotation matrices Rin,i, Rout,i, and matrix Mi which gives a delay τi between the polarizations. Accordingly, characteristics $T_N$ of the whole optical fiber are represented by the following equation (a).

$$T_N = \prod_{i=1}^{N} Ti = \prod_{i=1}^{N} R_{out,i}^{-1} M_i R_{in,i} \tag{a}$$

In the above-mentioned equation (a), each of Rin,i, Rout,i and Mi is expressed by the following equations (b) to (d).

$$R_{in,i} = \begin{pmatrix} \cos\phi i & -\sin\phi i \\ \sin\phi i & \cos\phi i \end{pmatrix} \tag{b}$$

$$R_{out,i} = \begin{pmatrix} \cos\theta i & -\sin\theta i \\ \sin\theta i & \cos\theta i \end{pmatrix} \tag{c}$$

$$Mi = \begin{pmatrix} e^{i\omega\Delta ti/2} & 0 \\ 0 & e^{-i\omega\Delta ti/2} \end{pmatrix} \tag{d}$$

In the model shown in FIG. 2, it is known that the polarization mode dispersion amount of the whole optical fiber has a Maxwell distribution, which matches actual measurement results. In the optical transmitter 10, two optical signals included in the polarization multiplexed optical signal are input into polarization axes orthogonal to each other to be multiplexed. However, in the optical receiver 30, the polarization multiplexed optical signals are received in complicatedly mixed states as the model representing the polarization mode dispersion shown in FIG. 2.

In the above-mentioned conditions, the filter coefficients set for the filters 35-1 to 35-4 are calculated by means of Minimum Mean Square Evaluation (MMSE). These filter coefficients calculated by means of the MMSE will be the filter coefficients for compensating the degradation of the transmission characteristics.

FIG. 3 is a diagram showing examples of the equations representing filter coefficients set for the filters 35-1 to 35-4 shown in FIG. 1. In the equations (e1) to (e4) shown in FIG. 3, $\lambda ij^{(i)}$ (i,j=1 or 2) represents the eigenvalue of the diagonal matrix to which a matrix characterizing the optical transmission path having the polarization mode dispersion is transformed by the Fourier transformation matrix and the inverse Fourier transformation matrix. And $\sigma s^2$ represents a signal light power and $\sigma n^2$ represents a noise power. The optical noise is assumed to be normally distributed.

By setting the equations (e1) to (e4) shown in FIG. 3 for the filter coefficients of the filters 35-1 to 35-4, respectively, the degradation of the transmission characteristics of the polarization multiplexed optical signal received through the optical transmission path 20 can be compensated. That is, the waveform distortion due to the polarization mode dispersion of the polarization multiplexed optical signal received through, the optical transmission path 20 can be compensated, and the influence of the optical noise can be suppressed. Moreover, the other optical signal component can be removed from the polarization multiplexed optical signal received through the optical transmission path 20.

But the equations (e1) to (e4) representing the filter coefficients are very complicated. Therefore, when implementing them on an integrated circuit such as an LSI, huge circuit resources are needed, which causes such problems that power consumption and component costs are increased.

However, the equations (e1) to (e4) shown in FIG. 3 can be simplified by using a special orthogonal relation between the eigenvalues of the matrix representing the characteristics of the optical transmission path 20 having the polarization mode dispersion as shown in FIG. 2.

FIG. 4 is a diagram showing simplified equations by condensing the equations representing the filter coefficients shown in FIG. 3. The equations (e1) to (e4) shown in FIG. 3 can be simplified in equations (f1) to (f4) shown in FIG. 4, respectively. Accordingly, by setting the equations (f1) to (f4), instead of the equations (e1) to (e4), for the filter coefficients in the filters 35-1 to 35-4, respectively, the circuit resources can be saved.

Here, it is considered that only one optical signal is transmitted and received without performing the polarization multiplexing in the optical transmitter.

Figure 5:
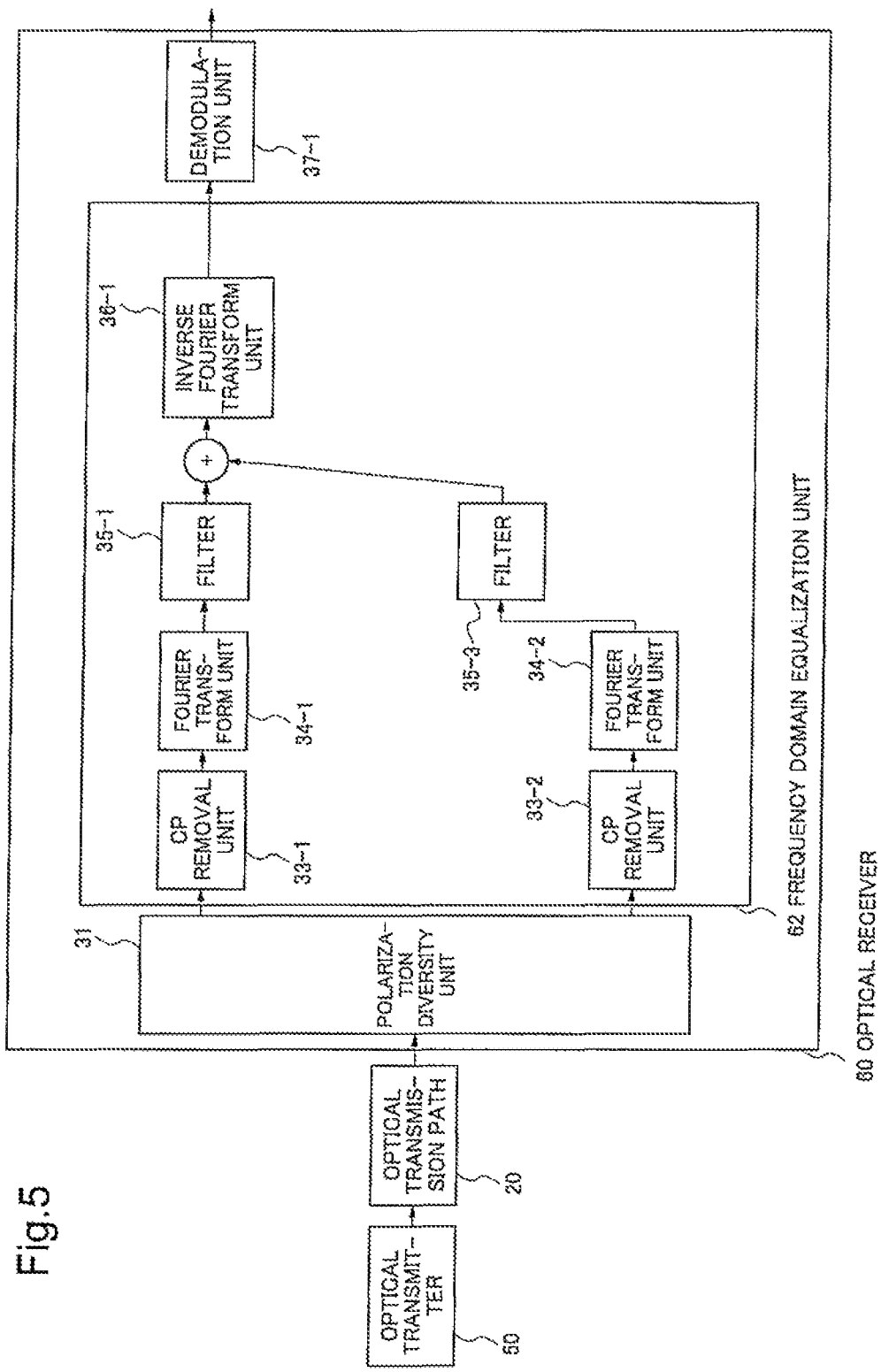
FIG. 5 is a block diagram showing an example of a structure of non-polarization multiplexing-demultiplexing optical communication system.

FIG. 5 is a block diagram showing an example of a structure of an optical communication system in which only one optical signal is transmitted and received without performing the polarization multiplexing in the optical transmitter (hereinafter referred to as non-polarization multiplexing-demultiplexing optical communication system). The structure of the communication system like the non-polarization multiplexing-demultiplexing optical communication system shown in FIG. 5 is generally called a structure of SIMO (Single Input Multiple Output) system.

In the non-polarization multiplexing-demultiplexing optical communication system shown in FIG. 5, an optical transmitter 50 transmits only one optical signal without performing the polarization multiplexing. An optical receiver 60 receives an optical signal transmitted from the optical transmitter 50 through an optical transmission path 20. The optical receiver 60 removes the Cyclic Prefix from two output signals from a polarization diversity unit 31 and performs the Fourier transform and filtering processes. After adding two signals on which these processes have been performed, the inverse Fourier transform is carried out.

Here, in the non-polarization multiplexing-demultiplexing optical communication system shown in FIG. 5 as an example, the equation (f1) shown in FIG. 4 is identical with the filter coefficient set for the filter 35-1 by means of the MMSE. Similarly, in the non-polarization multiplexing-demultiplexing optical communication system shown in FIG. 5 as an example, the equation (f3) shown in FIG. 4 is identical with the filter coefficient set for the filter 35-3 by means of the MMSE.

It can be confirmed that the filter coefficients mentioned above are identical by the fact that the transmission characteristics in the polarization multiplexing-demultiplexing optical communication system and the transmission characteristics in the non-polarization multiplexing-demultiplexing optical communication system are identical. Hereinafter, the transmission characteristics of the polarization multiplexing-demultiplexing optical communication system (MIMO system) and the non-polarization multiplexing-demultiplexing optical communication system (SIMO system) will be described.

Figure 6:
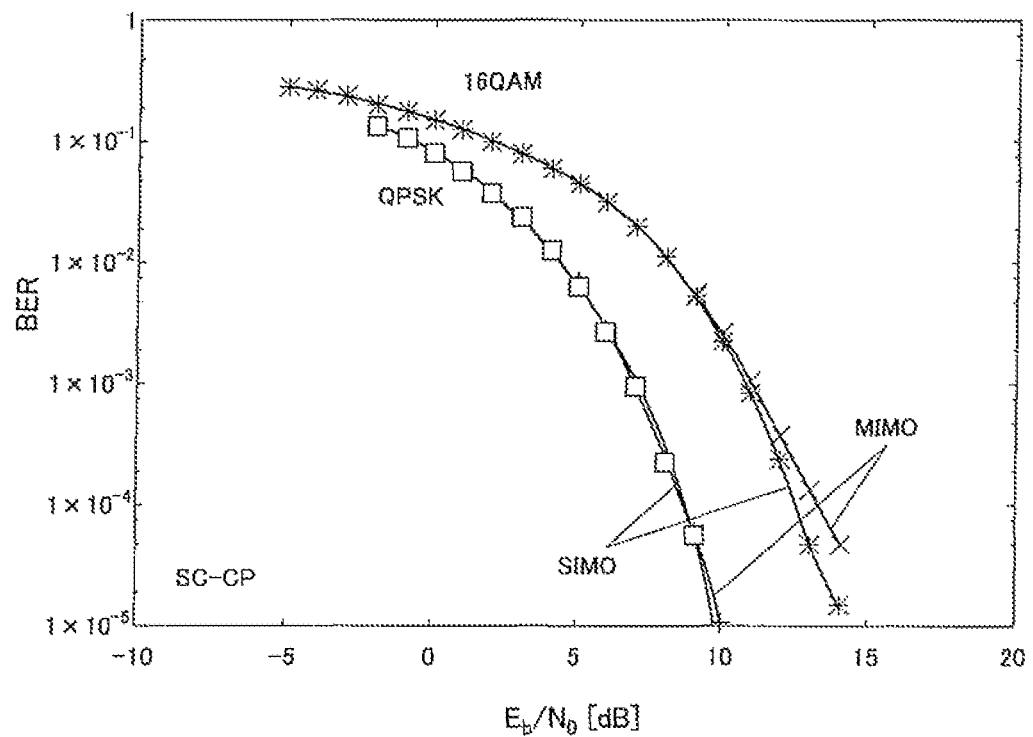
FIG. 6 is a diagram for comparing the transmission characteristics in the polarization multiplexing-demultiplexing optical communication system in accordance with a first exemplary embodiment of the present invention and non-polarization multiplexing-demultiplexing optical communication system.

FIG. 6 is a diagram for comparing the transmission characteristics in the polarization multiplexing-demultiplexing optical communication system and the non-polarization multiplexing-demultiplexing optical communication system. FIG. 6 shows a case in which the frequency domain equalization by the SC-CP system is used as an example. In FIG. 6, a vertical axis represents a bit error rate (BER), and a horizontal axis represents energy per bit to noise power spectral density ratio (Eb/N0). In the diagram, symbols of "+" and "×" indicate data in the polarization multiplexing-demultiplexing optical communication system (MIMO system), and symbols of "*" and quadrangles indicate data in the non-polarization multiplexing-demultiplexing optical communication system (SIMO system). As shown in FIG. 6, the polarization multiplexing-demultiplexing optical communication system (MIMO system) and the non-polarization multiplexing-demultiplexing optical communication system (SIMO system) show almost the same transmission characteristics.

As mentioned above, it turns out that the filter coefficients for compensating the degradation of the transmission characteristics in the non-polarization multiplexing-demultiplexing optical communication system are directly applicable to the filter coefficients for compensating the degradation of the transmission characteristics in the polarization multiplexing-demultiplexing optical communication system. As a result, the degradation of the transmission characteristics in the polarization multiplexing-demultiplexing optical communication system can be compensated.

In this way, the optical receiver 30 according to this exemplary embodiment has the filters 35-1 to 35-4 for which the filter coefficients are set for compensating the degradation of the transmission characteristics in one optical signal without the polarization multiplexing by means of the frequency domain equalization. And then, the optical receiver 30 receives the optical signal obtained by multiplexing two optical signals having the same frequency band of carrier waves and polarization states orthogonal to each other through the optical transmission path 20. The optical receiver 30 demultiplexes the received signal into the signals corresponding to two optical signals by using the filters 35-1 to 35-4 and compensates the degradation of the transmission characteristics in the demultiplexed signals by the frequency domain equalization.

Here, the filter coefficients set for the filters 35-1 to 35-4 in the optical receiver 30 are the same as the filter coefficients for compensating the degradation of the transmission characteristic in one optical signal without the polarization multiplexing by means of the frequency domain equalization. The values of the filter coefficients can be obtained from the simple equations. Therefore, in order to compensate the degradation of the transmission characteristics in the received polarization multiplexed optical signals, a lot of circuit resources are unnecessary. Accordingly, the original transmission data can be demodulated correctly from the polarization multiplexed optical signal with low power consumption and low costs.

In this exemplary embodiment, the case is described as an example in which the frequency domain equalization by the SC-CP system is used. However, the similar effects can be obtained in the cases in which the OFDM system, the overlap FDE system, or the like are applied to the frequency domain equalization.

Exemplary Embodiment 2

In this exemplary embodiment, a case will be described in which filter coefficients are set in the polarization multiplexing-demultiplexing optical communication system by the optical receiver receiving each of two optical signals having the same frequency band of carrier waves and polarization states orthogonal to each other.

Figure 7:
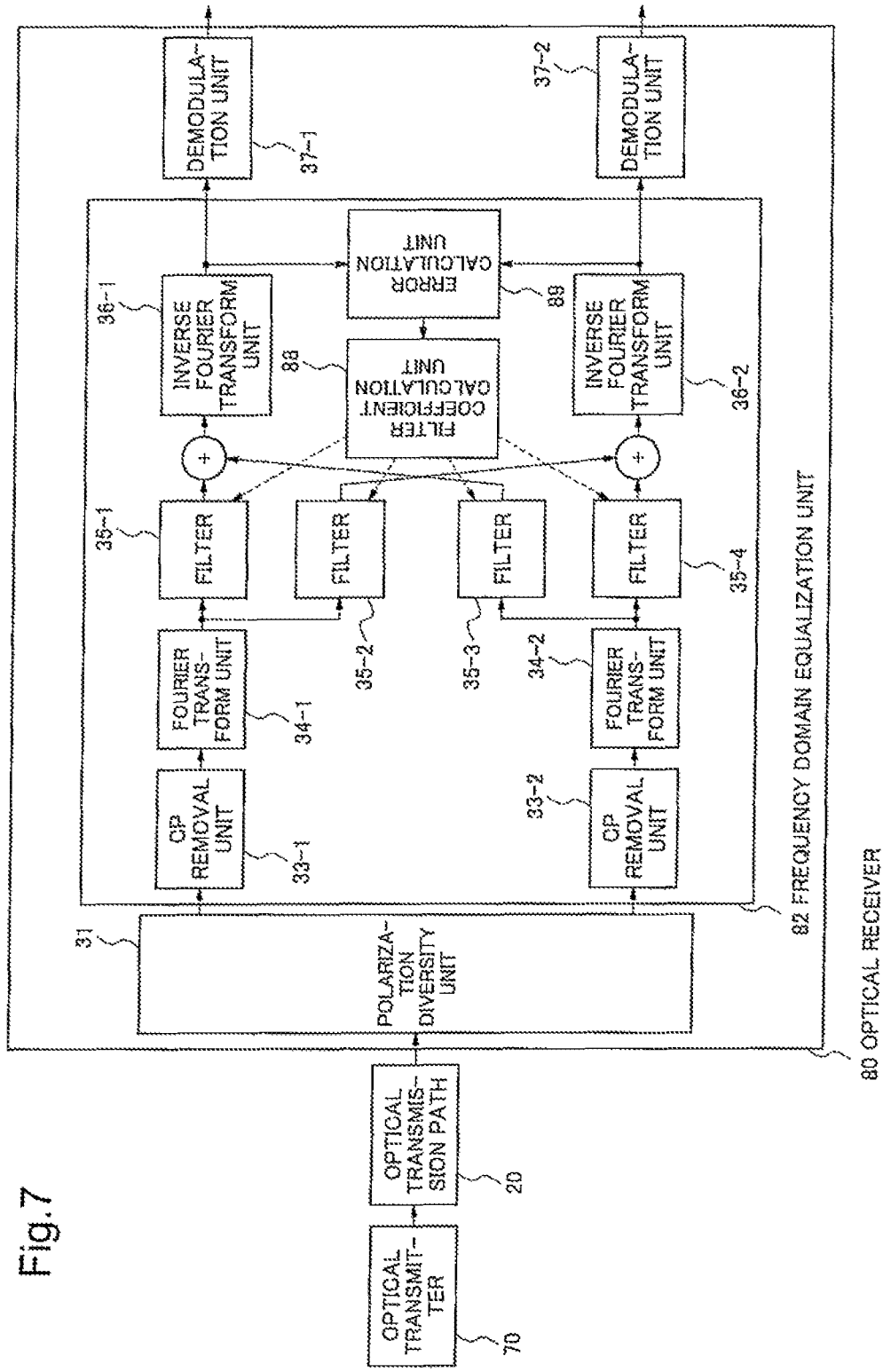
FIG. 7 is a block diagram showing a structure of a polarization multiplexing-demultiplexing optical communication system to which an optical receiver in accordance with a second exemplary embodiment of the present invention is applied.

FIG. 7 is a block diagram showing a structure of a polarization multiplexing-demultiplexing optical communication system using the optical receiver of this exemplary embodiment. As shown in FIG. 7, the polarization multiplexing-demultiplexing optical communication system of this exemplary embodiment includes an optical transmitter 70 and an optical receiver 80. The optical transmitter 70 and the optical receiver 80 are connected to each other through the optical transmission path 20.

The optical transmitter 70 has the same structure and function as the optical transmitter 10 shown in FIG. 1. According to this exemplary embodiment, the optical transmitter 70 transmits an optical signal using a predetermined training signal as a transmission data to the optical receiver 80.

Compared with the optical receiver 30 shown in FIG. 1, the optical receiver 80 is further provided with a filter coefficient calculation unit 88 and an error calculation unit 89. Since the other components and function of the optical receiver 80 are similar to the optical receiver 30 shown in FIG. 1, their descriptions are omitted here.

The error calculation unit 89 stores the training signal in advance. The error calculation unit 89 calculates an error between the stored training signal and output signals from the inverse Fourier transform units 36-1 and 36-2. And then the error calculation unit 89 outputs the error information representing a calculated error to the filter coefficient calculation unit 88.

The filter coefficient calculation unit 88 accepts the error information output from the error calculation unit 89. The filter coefficient calculation unit 88 repeats to calculate filter coefficients of the filters 35-1 to 35-4 according to a predetermined algorithm based on the error represented by the accepted error information. As a result, the filter coefficients of the filters 35-1 to 35-4 are being updated. As an example of the algorithm calculating the filter coefficients, an algorithm such as LMS (Least Mean Square) which is generally used for an adaptive filter can be employed. And then the filter coefficient calculation unit 88 sets the filter coefficients at the time that the updated width of the filter coefficients has become small enough as the optimum filter coefficients for the filters 35-1 to 35-4.

In what follows, operation of setting the optimum filter coefficients by the optical receiver 80 will be described in the polarization multiplexing-demultiplexing optical communication system in accordance with this exemplary embodiment. In this exemplary embodiment, optical signals A and B represent two optical signals having the same frequency band of carrier waves and polarization states orthogonal to each other. As mentioned above, it is supposed that the error calculation unit 89 stores the training signal used for the optical signals A and B.

Figure 8:
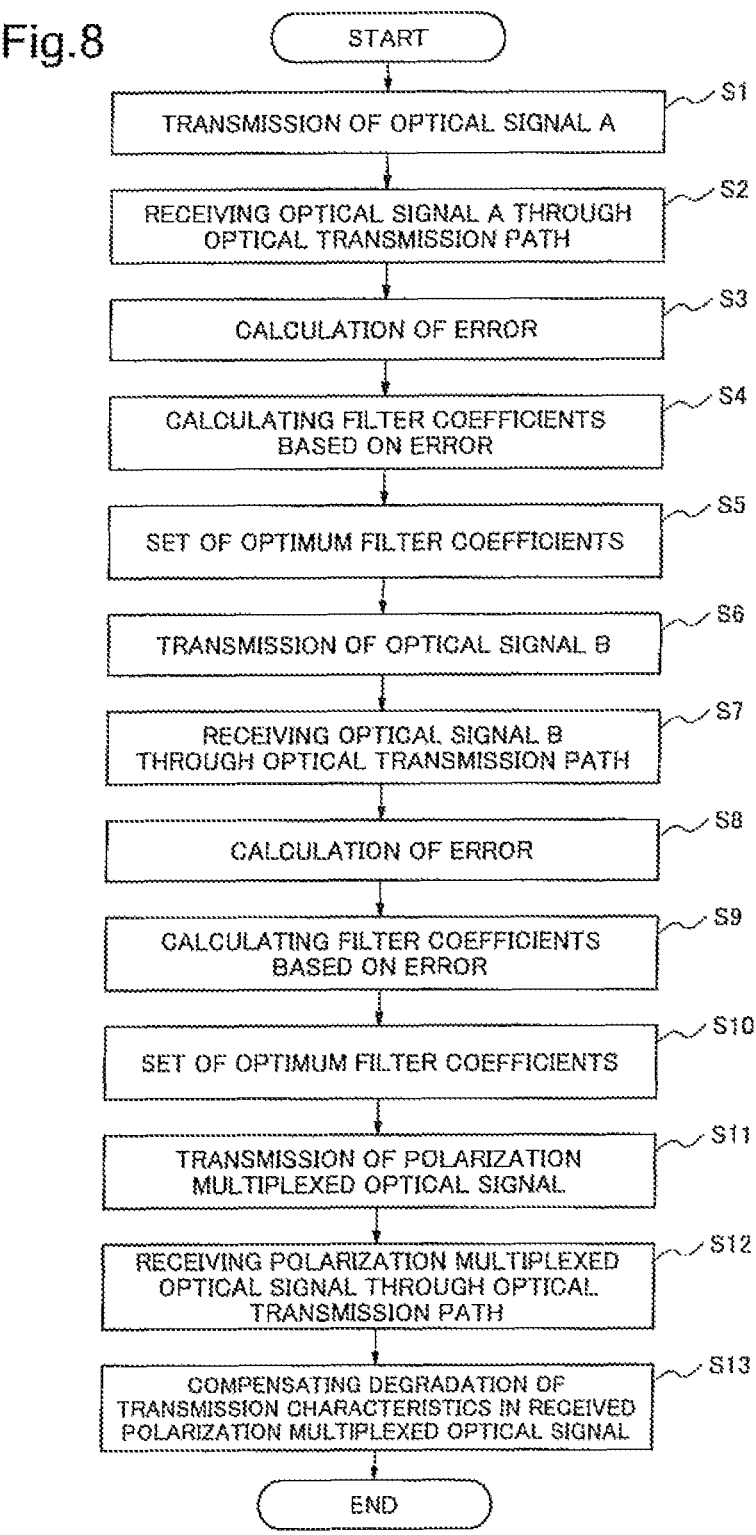
FIG. 8 is a flowchart illustrating an operation of an optical receiver which sets optimum filter coefficients in the polarization multiplexing-demultiplexing optical communication system in accordance with a second exemplary embodiment of the present invention.

FIG. 8 is a flowchart illustrating the operation of the optical receiver 80 which sets the optimum filter coefficients in the polarization multiplexing-demultiplexing optical communication system shown in FIG. 7. First, the optical transmitter 70 transmits only the optical signal A to the optical receiver 80 (Step S1).

The polarization diversity unit 31 of the optical receiver 80 receives the optical signal A transmitted from the optical transmitter 70 by means of the polarization diversity reception system through the optical transmission path 20 (Step S2). And then the polarization diversity unit 31 outputs the x-polarization signal and the y-polarization signal to the frequency domain equalization unit 82.

Next, the CP removal units 33-1 and 33-2 remove the Cyclic Prefix from the x-polarization signal and the y-polarization signal. The Fourier transform units 34-1 and 34-2 perform the Fourier transform processing to the signals from which the Cyclic Prefix has been removed. After multiplying the Fourier transformed signals by the filter coefficients, the filters 35-1 to 35-4 output the results to the inverse Fourier transform units 36-1 and 36-2. The inverse Fourier transform units 36-1 and 36-2 accept the output signals from the filters 35-1 to 35-4, and perform the inverse Fourier transform to the accepted signals, then output the results.

Next, the error calculation unit 89 accepts the output signals from the inverse Fourier transform units 36-1 and 36-2 and calculates the error between the accepted signals and the stored signal (Step S3). And then the error calculation unit 89 outputs the error information representing the calculated error to the filter coefficient calculation unit 88. The filter coefficient calculation unit 88 accepts the error information, fixes each of the filter coefficients of the filters 35-2 and 35-4 to 0, and repeats a calculation of the filter coefficients of the filters 35-1 and 35-3 based on the error represented by the accepted error information (Step S4). As a result, the filter coefficients of the filters 35-1 and 35-3 are updated. And then the filter coefficient calculation unit 88 sets the filter coefficients of the filters 35-1 and 35-3 at the time that the updated each width of the filter coefficient has become small enough as the optimum filter coefficients for the filters 35-1 and 35-3 (Step S5).

Next, the optical transmitter 70 suspends a transmission of the optical signal A. And then the optical transmitter 70 transmits the optical signal B to the optical receiver 80 (Step S6).

The polarization diversity unit 31 of the optical receiver 80 receives the optical signal B transmitted from the optical transmitter 70 by means of the polarization diversity reception system through the optical transmission path 20 (Step S7). And then the polarization diversity unit 31 outputs the x-polarization signal and the y-polarization signal to the frequency domain equalization unit 82.

Next, the CP removal units 33-1 and 33-2 remove the Cyclic Prefix from the x-polarization signal and the y-polarization signal. The Fourier transform units 34-1 and 34-2 perform the Fourier transform processing to the signals from which the Cyclic Prefix has been removed. After multiplying the Fourier transformed signals by the filter coefficients, the filters 35-1 to 35-4 output the results to the inverse Fourier transform units 36-1 and 36-2. The inverse Fourier transform units 36-1 and 36-2 accept the output optical signals from the filters 35-1 to 35-4, and perform inverse Fourier transform to the accepted optical signals, then output the results.

Next, the error calculation unit 89 accepts the output signals from the inverse Fourier transform units 36-1 and 36-2 and calculates the error between the accepted signals and the stored signal (Step S8). And then the error calculation unit 89 outputs the error information representing a calculated error to the filter coefficient calculation unit 88. The filter coefficient calculation unit 88 accepts the error information, fixes each of the filter coefficients of the filters 35-1 and 35-3 to 0, and repeats a calculation of the filter coefficients of the filters 35-2 and 35-4 based on the error represented by the accepted error information (Step S9). As a result, the filter coefficients of the filters 35-2 and 35-4 are updated. And then the filter coefficient calculation unit 88 sets the filter coefficients of the filters 35-2 and 35-4 at the time that the updated each width of the filter coefficient has become small enough as the optimum filter coefficients for the filters 35-2 and 35-4 (Step S10).

Next, the optical transmitter 70 suspends the transmission of the optical signal B, and begins to transmit the polarization multiplexed optical signal in which the optical signal A and the optical signal B are multiplexed (Step S11).

The polarization diversity unit 31 in the optical receiver 80 receives the polarization multiplexed optical signal transmitted from the optical transmitter 70 through the optical transmission path 20 by means of the polarization diversity reception system (Step S12). Here, the optimum filter coefficients of the filters 35-1 to 35-4 which have been calculated by the operation mentioned above are the filter coefficients optimized to the SIMO system. However, as mentioned above, the filter coefficients optimized to the SIMO system are also optimized to the MIMO system. Therefore, even when the optical transmitter 70 transmits the polarization multiplexed optical signal in which the optical signal A and the optical signal B are multiplexed, the optimum filter coefficients calculated by the operation mentioned above are to directly applicable.

The optical receiver 80 compensates the degradation of the transmission characteristic in the received polarization multiplexed optical signal by means of the frequency domain equalization using the filters 35-1 to 35-4 for which the optimum filter coefficients have been set (Step S13).

When the characteristics of the optical transmission path 20 temporally fluctuates, the optical signal A and the optical signal B are transmitted in a predetermined time interval even after the optical transmitter 70 starts to transmit the polarization multiplexed signal. Whenever the optical signal A and the optical signal B are received, the filter coefficient calculation unit 88 in the optical receiver 80 recalculates the optimum filter coefficients. As a result, the filter coefficients following temporal fluctuation of the characteristics of the optical transmission path 20 can be obtained.

In this way, when the optical transmitter 70 transmits the two optical signals having the same frequency band of carrier waves and polarization states orthogonal to each other, the optical receiver 80 according to this exemplary embodiment compensates the degradation of the transmission characteristic of the optical signal by the frequency domain equalization. That is, the optical receiver 80 has the filters 35-1 to 35-4 for which the filter coefficients are set for compensating the degradation of the transmission characteristic in one optical signal without the polarization multiplexing by means of the frequency domain equalization.

Here, the filter coefficients set for the filters 35-1 to 35-4 in the optical receiver 80 are the numerical values calculated by the simple equations. Therefore, in order to compensate the degradation of the transmission characteristics in the received polarization multiplexed optical signals, a lot of circuit resources are unnecessary. Accordingly, the original transmission data can be demodulated correctly from the received polarization multiplexed optical signal with low power consumption and low costs.

In the first and second exemplary embodiments mentioned above, the polarization multiplexing-demultiplexing optical communication systems using one carrier wave frequency are described as an example. However, even in an optical communication system such as a wavelength division multiplexing (WDM) system in which a plurality of optical signals having mutually different carrier wave frequencies are multiplexed, similar effects mentioned above can be obtained by applying these exemplary embodiments to each carrier wave.

Generally, in an ultra-high speed optical communication system, there is a problem that the transmission characteristics degrade owing to a polarization mode dispersion in an optical fiber. This is because a propagation delay occurs between the lights having different polarization owing to the fact that a propagation constant of the optical fiber is slightly different depending on the polarization axes of the optical fiber.

In the polarization multiplexing-demultiplexing optical communication system which transmits and receives the polarization multiplexed optical signal, it is necessary for the optical receiver to compensate a waveform distortion of the received optical signal owing to the polarization mode dispersion mentioned above while demultiplexing the polarization multiplexed optical signals into separate two optical signals. The optical receiver in the polarization multiplexing-demultiplexing optical communication system also needs to minimize the influence of optical noise as well as other optical receivers in general optical communication systems.

As to a method to realize those functions, CMA (Constant Modulus Algorithm) is widely known. The CMA is an algorithm which operates to update the filter coefficients of a digital filter so that an envelope of an output signal from the digital filter can be kept constant.

As for the digital filter, an FIR (Finite Impulse Response) filter is generally employed. Because a data on the time domain is processed in the FIR filter, the CMA is also called time domain equalization (TDE).

FIG. 9 is a block diagram showing an example of a structure of the polarization multiplexing-demultiplexing optical communication system in which the equalization is performed by means of the CMA.

An optical transmitter 100 modulates two transmission data into two optical signals having the same frequency band of carrier waves and polarization states orthogonal to each other. And an optical transmitter 100 transmits a polarization multiplexed optical signal in which the two optical signals are multiplexed to an optical receiver 300 through an optical transmission path 200.

A polarization diversity unit 301 in the optical receiver 300 receives the polarization multiplexed optical signal transmitted from the optical transmitter 100 by means of the polarization diversity reception system. Two signals are obtained by this polarization diversity reception system.

A CMA unit 310 accepts two input signals obtained by the polarization diversity reception system. An equalization process is performed to the two accepted signals by using filters 311-1 to 311-4.

An output signal, which is obtained by adding the output signal from the filter 311-1 and the output signal from the filter 311-3, is sent to a demodulation unit 37-1. Another output signal, which is obtained by adding the output signal from the filter 311-2 and the output signal from the filter 311-4, is sent to a demodulation unit 37-2.

An error calculation unit 309 calculates an error compared with the expected characteristics, that is, an envelope of the output signal is kept constant, from the output signal, and outputs an error signal representing the calculated error to a filter coefficient calculation unit 308.

The filter coefficient calculation unit 308 updates the filter coefficients of the filters 311-1 to 311-4 based on the error signal output from the error calculation unit 309.

By repeating the operation mentioned above, the filter coefficients of the filters 311-1 to 311-4 are optimized so that the degradation of the transmission characteristics can be compensated, and original transmission data can be demodulated correctly.

In this way, by using the equalization method with the CMA, the filter coefficients are updated so that the optical receiver 300 can demultiplex the polarization multiplexed optical signals including two independent optical signals, compensate the waveform distortion of the reception signal owing to the polarization mode dispersion, and minimize the influence of an optical noise. Therefore, the original transmission data can be demodulated from the polarization multiplexed optical signal.

However, in the equalization by means of the CMA mentioned above, depending on the polarization state of the received optical signal, there is a possibility that the filter coefficients can not converge to numerical values for compensating the waveform distortion of the received signal owing to the polarization mode dispersion and for minimizing the influence of the optical noise. Therefore, there is a problem that the original transmission data cannot be demodulated correctly from the received optical signals.

In addition, the FIR filter used for the CMA as the digital filter requires a lot of circuit resources according to an increase in the number of taps. Therefore, there is another problem that power consumption and component costs are increased.

An exemplary advantage according to the invention is that a lot of circuit resources are unnecessary in order to compensate the degradation of the transmission characteristics in the received polarization multiplexed optical signals. Accordingly, the original transmission data can be demodulated correctly from the polarization multiplexed optical signal with low power consumption and low costs.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

The invention claimed is:

1. An optical receiver comprising:
a polarization diversity unit receiving one of a polarization multiplexed optical signal obtained by multiplexing two single polarization optical signals having a same frequency band of carrier waves and polarization states orthogonal to each other or receiving one of the two single polarization optical signals; and
a frequency domain equalization unit receiving signal components parallel to mutually orthogonal polarization axes from the polarization diversity unit,
wherein the frequency domain equalization unit includes filters for which filer coefficients are set for compensating degradation of transmission characteristics of the polarization multiplexed optical signal,
wherein the coefficients for some of the filters are set for compensating degradation of transmission characteristics in only one of the two signal polarization multiplexed optical signals comprised in the polarization multiplexed optical signal by means of the filters in a first step when the one of the two single polarization optical signal is transmitted,
the coefficients for the others of the filters are set for compensating degradation of transmission characteristics in the other one of the two single polarization optical signals comprised in the polarization multiplexed optical signal by means of the filters in a second step when the other one of the two single polarization optical signal is transmitted,
the compensating is performed on the polarization multiplexed optical signal after the coefficients for all filters are set m the first step and the second step.

2. An optical communication system comprising:
an optical transmitter transmitting one of a polarization multiplexed optical signal obtained by multiplexing two single polarization optical signals having a same frequency band of carrier waves and polarization states orthogonal to each other or transmitting one of the two single polarization optical signals; and
an optical receiver receiving one of the polarization multiplexed optical signal or receiving one of the two single polarization optical signals transmitted from the optical transmitter through a transmission path and compensating degradation of transmission characteristics in either the received polarization multiplexed optical signal or the received single polarization optical signals,
wherein the optical receiver includes a polarization diversity unit receiving either the polarization multiplexed optical signal or the single polarization optical signals, and a frequency domain equalization unit receiving signal components parallel to mutually orthogonal polarization axes from the polarization diversity unit, and
wherein the frequency domain equalization unit includes filters for which filer coefficients are set for compensating degradation of transmission characteristics of either the polarization multiplexed optical signal or the single polarization optical signals,
wherein the coefficients for some of the filters are set for compensating degradation of transmission characteristics in only one of the two single polarization optical signals comprised in the polarization multiplexed optical signal by means of the filters in a first step when the single polarization optical signal is transmitted,
the coefficients for the others of the filters are set for compensating degradation of transmission characteristics in the other one of the two single polarization optical signals comprised in the polarization multiplexed optical signal by means of the filters in a second step when the single polarization optical signal is transmitted,
the compensating is performed on the polarization multiplexed optical signal after the coefficients for all filters are set in the first step and the second step.

3. The optical communication system according to claim 2,
wherein the optical transmitter transmits each of the two single polarization optical signals, respectively, before starting to transmit the polarization multiplexed optical signal;
the optical receiver,
in the first step when the optical transmitter transmits only one of the two single polarization optical signals, receives said one of the single polarization optical signals through the transmission path and calculates optimum coefficients for some of the filters for compensating degradation of transmission characteristics in the single polarization optical signal by frequency domain equalization,
in the second step when the optical transmitter transmits the other one of the two single polarization optical signals, receives said other one of the single polarization optical signal through the transmission path and calculates optimum coefficients for the others of the filters for compensating degradation of transmission characteristics in the single polarization optical signal by frequency domain equalization,
sets calculated optimum filter coefficients for the filters, and
when the optical transmitter transmits the polarization multiplexed optical signal, and receives the polarization multiplexed optical signal through the transmission path and demultiplexes received polarization multiplexed optical signal into two optical signals corresponding to the two single polarization optical signals, respectively, by using the filters, and compensates degradation of transmission characteristics in demultiplexed optical signals by means of the frequency domain equalization.

4. The optical communication system according to claim 3, wherein the optical transmitter transmits each of the two single polarization optical signals in a predetermined time interval, respectively, after starting to transmit the polarization multiplexed optical signal; and the optical receiver, whenever the optical transmitter transmits only one of the two single polarization optical signals, receives said one of the single polarization optical signal and recalculates the optimum coefficients for some of the filters, whenever the optical transmitter transmits the other one of the two single polarization optical signals, receives said one of the single polarization optical signal and recalculates the optimum coefficients for the others of the filters.

5. The optical communication system according to claim 2, wherein the frequency domain equalization is employed in a single carrier block transmission with cycle prefix system as a communication system between the optical transmitter and the optical receiver.

6. The optical communication system according to claim 2, wherein the frequency domain equalization is employed in an orthogonal frequency division multiplexing system as a communication system between the optical transmitter and the optical receiver.

7. The optical communication system according to claim 2, wherein the frequency domain equalization is employed in an overlap frequency domain equalization system as a communication system between the optical transmitter and the optical receiver.

8. An equalization method in an optical communication system which comprises an optical transmitter transmitting one of a polarization multiplexed optical signal obtained by multiplexing two single polarization optical signals having a same frequency band of carrier waves and polarization states orthogonal to each other or transmitting one of the two single polarization optical signals, and an optical receiver receiving one of the polarization multiplexed optical signal or receiving one of the two single polarization optical signals transmitted from the optical transmitter through a transmission path, comprising the steps of:

transmitting a polarization multiplexed optical signal obtained by multiplexing two single polarization optical signals having a same frequency band of carrier waves and polarization states orthogonal to each other;

receiving the polarization multiplexed optical signal through a transmission path; and compensating degradation of transmission characteristics in received the polarization multiplexed optical signal, wherein, in step of receiving, demultiplexing received polarization multiplexed optical signal into signal components parallel to mutually orthogonal polarization axes; and in step of compensating, filtering the signal components by using filter coefficients, wherein parts of the filter coefficients are set for compensating degradation of transmission characteristics in only one of the two single polarization optical signals comprised in the polarization multiplexed optical signal in a first step when one of the two single polarization optical signal is transmitted, other parts of the filter coefficients are set for compensating degradation of transmission characteristics in the other one of the two single polarization optical signals comprised in the polarization multiplexed optical signal in a second step when the other of the two single polarization optical signal is transmitted.

9. The equalization method in the optical communication system according to claim 8, wherein, in step of transmitting, transmitting each of the two single polarization optical signals, respectively, before starting to transmit the polarization multiplexed optical signal; and in step of compensating, in the first step when the optical transmitter transmits only one of the two single polarization optical signals, calculating optimum coefficients for some of the filters for compensating degradation of transmission characteristics in said one of the single polarization optical signal by frequency domain equalization, and in the second step when the optical transmitter transmits the other one of the two single polarization optical signals, calculating optimum coefficients for the others of the filters for compensating degradation of transmission characteristics in said other one of the single polarization optical signal by frequency domain equalization, and in third step when the optical transmitter transmits the polarization multiplexed optical signal, filtering the signal components by using calculated optimum filter coefficients.

10. The equalization method in the optical communication system according to claim 9, wherein, in step of transmitting, transmitting each of the two single polarization optical signals in a predetermined time interval, respectively, after starting to transmit the polarization multiplexed optical signal; and in step of compensating, when the optical transmitter transmits only one of the two single polarization optical signals, recalculating optimum coefficients for some of the filters for compensating degradation of transmission characteristics in the single polarization optical signal by frequency domain equalization, and when the optical transmitter transmits the other one of the two single polarization optical signals, recalculating optimum coefficients for the others of the filters for compensating degradation of transmission characteristics in the single polarization optical signal by frequency domain equalization.

* * * * *